Oct. 12, 1965 R. S. GARDNER 3,212,054
TRANSMITTER KEYING AND RECEIVER BLANKING CIRCUIT
Filed Oct. 4, 1950
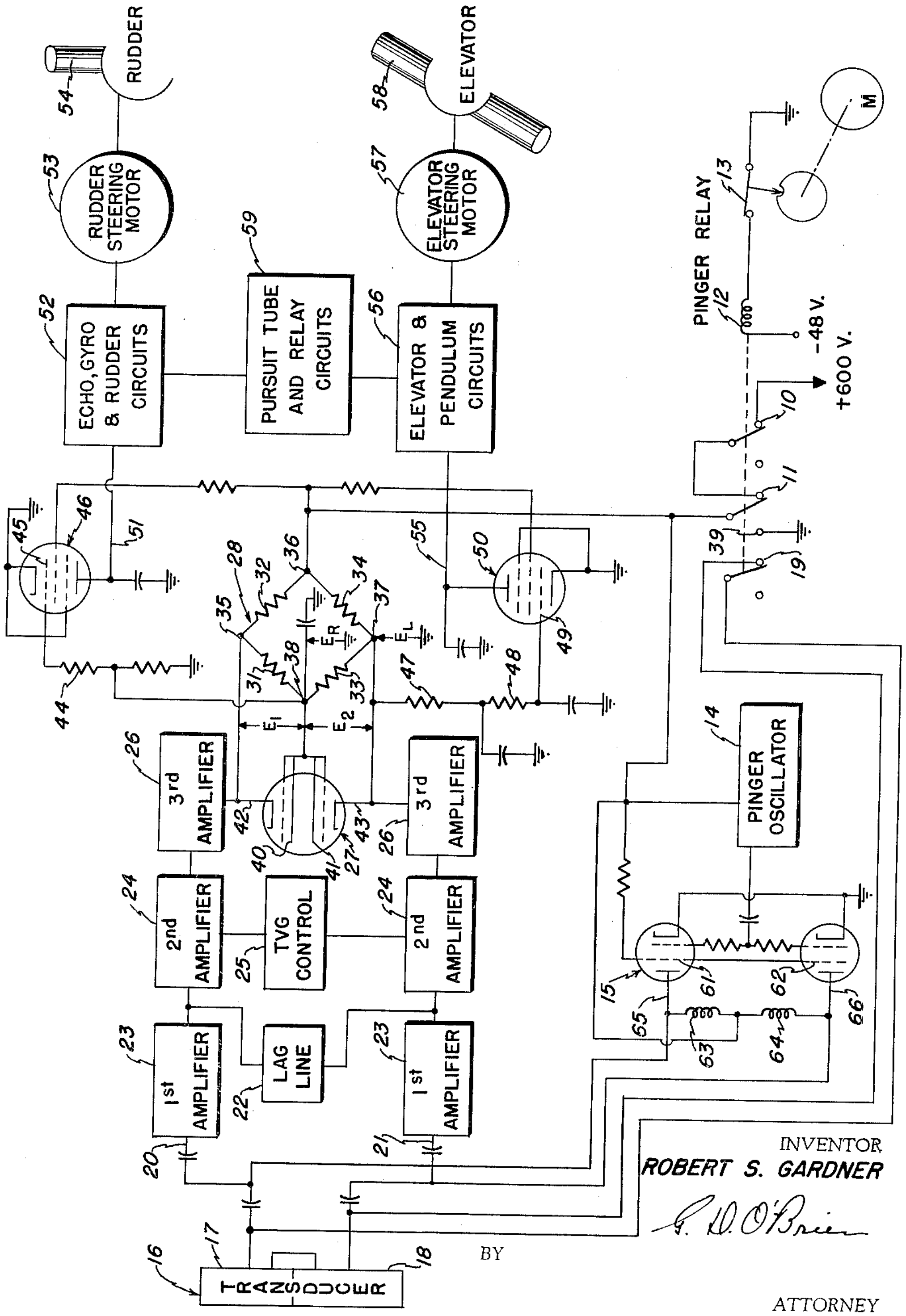
INVENTOR
ROBERT S. GARDNER
BY
ATTORNEY United States Patent Office 3,212,054
Patented Oct. 12, 1965

3,212,054

TRANSMITTER KEYING AND RECEIVER BLANKING CIRCUIT

Robert S. Gardner, Key West, Fla., assignor, by mesne assignments, to the United States of America as represented by the Secretary of the Navy Filed Oct. 4, 1950, Ser. No. 188,466
3 Claims. (Cl. 340—3)

The invention relates to improvements in echo-controlled torpedoes and more specifically to transmitter keying and receiver blanking circuits for echo signaling systems.

The primary object of the invention is to provide an echo signaling system with an improved circuit adapted to blank the echo signal receiver during keying of the transmitter.

Another object is the provision of means utilizing the voltage supplied to the transmitter power amplifier for blanking the receiver during transmission intervals.

Other objects and advantages of the invention will become apparent during the course of the following detailed description, taken in connection with the accompanying drawing, forming a part of this specification.

The single figure of the drawing is a diagrammatic view of the echo-controlled steering system provided with the improved transmitter keying and receiver blanking circuits.

Under the control of series contacts 10, 11 of a pinger relay 12 energized upon closing of a motorized pinger switch 13, pulses or pings of 60-kc. voltage and 30 milliseconds duration are generated and amplified by a pinger oscillator 14 and an amplifier 15. These pulses or pings are projected underwater every 0.8 second by a transducer 16 whose vertically spaced sections 17, 18 are connected in parallel during transmission by a contact 19 of the pinger relay 12. The supersonic waves leave the transducer and, if there is a target present within range, are reflected back as echoes. Upon reaching the transducer, these echoes are translated into electrical input signals in dual amplifier channels 20, 21, the two parts of the transducer acting independently during reception.

If an echo returns from a target below the axis of the torpedo, the wave front will strike the lower half of the transducer first and the signal voltage generated in the lower half will lead in phase that generated in the upper half. Likewise, if the echoes are from a target above the axis of the torpedo, the signal voltage in the upper half will lead that in the lower half. This phase difference is converted into an amplitude difference by a lag line 22 following the first stage 23 of dual amplification. At the second amplifier stage 24, the overall sensitivity of the receiver is gradually increased during each reception interval by a time-variation-of-gain (TVG) control 25. This TVG control prevents false tripping of the steering control circuits on reverberation immediately following the ping and also prevents amplifier overloading on strong echo signals at close range.

The processed signals from both channels 20, 21, after a third amplifier stage 26, are rectified by a twin diode 27 and applied to a comparator bridge 28 which acts as interpreter and disseminator of information necessary for correct rudder and elevator operation. This comparator bridge comprises four resistor arms 31–34 joined at corners 35–38. During reception the right corner 36 is grounded through a pinger relay contact 39. The plates 40, 41 of the twin diode 27 are each connected to the left corner 38 of the bridge, and the cathodes 42, 43 are connected one to the upper corner 35 and the other to the lower corner 37. Potential from the left corner 38 is impressed through a resistor 44 on the control grid 45 of an echo trip pentode 50. The resistors 32, 34 at the right side of the bridge have a resistance twice that of the resistors 31, 33 at the left side.

Normally, when no echoes are present both the echo tube 46 and the elevator tube 50 conduct plate current. The echo tube plate circuit 51 forms part of the echo, gyro and rudder circuits 52 which control a reversible rudder steering motor 53 adapted to displace the torpedo rudder 54 to the right or left. The elevator tube plate circuit 55 forms part of the elevator and pendulum circuits 56 which control a reversible elevator steering motor 57 adapted to elevate or depress the torpedo elevators 58.

When the rectified channel voltages $E_1$ and $E_2$ are equal, the voltage $E_R$ derived from the left bridge corner 38 for echo tube control is negative and equal to either channel voltage; and the voltage $E_L$ derived from the lower bridge corner 37 for elevator tube control is equal to one half the difference between voltages $E_1$ and $E_2$, which is zero.

When the rectified channel voltage $E_1$ and $E_2$ are unequal, the voltage $E_R$ at the left bridge corner 38 is equal to minus one half the sum of the voltages $E_1$ and $E_2$, which is always negative; and the voltage $E_L$ derived from the lower bridge corner 37 is equal to one half the difference between voltages $E_2$ and $E_1$. Voltage $E_L$ is therefore positive if voltage $E_2$ is greater than voltage $E_1$ and negative if voltage $E_1$ is greater than voltage $E_2$.

Three stages are involved in the operation of the torpedo, namely, initial dive, search and pursuit. The purpose of the initial dive is to get the torpedo down to its operating depth as soon as possible. The search stage enables the torpedo to make a 360 degree sweep of the surrounding region to locate the target. The pursuit stage is that wherein the device is homing on the target. As soon as the torpedo starts its dive, it goes into a port circle having a radius of about 140 feet, under the control of a gyroscope (not shown) associated with the echo, gyro and rudder circuits 52.

When the first echo of sufficient duration and magnitude is received during search, while the torpedo is normally turning in a port circle, the left corner 38 of the bridge becomes negative regardless of the direction from which the echoes arrive, as previously explained. The normally conducting echo tube is biased to cut off by the negative voltage from the bridge corner 38, thereby deenergizing the echo tube plate circuit 51. Thereupon the echo, gyro and rudder circuits 52 are adapted to so energize the rudder steering motor 53 that the course of the torpedo will be changed from port to starboard. This will eventually result in the loss of the signal since the torpedo will turn away from the target. Upon the loss of the echo signals, and after a prescribed time, the horizontal steering control circuits 52 are adapted to reverse the rudder steering motor 53. Thereupon the torpedo will resume its port circular turn until echoes are again received, when it will change its course once more to starboard. This operation, continuing until actual contact is made with the target, is called off-on steering.

Depth steering for all stages of operation of the torpedo is eventually controlled by a pendulum (not shown) associated with the elevator and pendulum circuits 56. While searching for a target, the torpedo is directed along a downward helical path of a substantially constant slightly negative pitch angle controlled by the elevator and pendulum circuits. As for depth steering during pursuit, the comparator bridge resolves the amplitude difference between the rectified outputs of the two channels 20, 21 into either positive or negative signal voltage depending on whether the echo source is above or below the transducer. This signal voltage is impressed on the control grid 49 of the elevator tube 50 which, in conjunction with the elevator and pendulum circuits 56, controls depth steering through a transfer of control effected upon energization of the pursuit tube and relay circuits 59. These circuits 59 are energized upon the dropping out of a relay (not shown) forming part of the echo, gyro and rudder circuits 52 when the echo tube 46 cuts off conduction in its plate circuit 51.

The series contacts 10, 11 on the pinger relay 12 which closes for 30 milliseconds every 0.8 second provide voltage for the screen grids 61, 62 and, through inductances 63, 64, to the plate circuits 65, 66 of the pinger power amplifier 15.

Receiver blanking is obtained from the same series contacts 10, 11 by applying the +600 volts used for the transmitter power amplifier to the right corner 36 of the bridge. This causes all points of the bridge to become positive during transmission thus maintaining positive bias on the control grids 45, 49 of the echo and elevator tubes 46, 50, respectively. These tubes therefore remain conductive and no steering response occurs. From the foregoing, it is clear that an improved circuit for transmitter keying and receiver blanking has been devised.

Various changes may be made in the form of invention herein shown and described without departing from the spirit of the invention or the scope of the following claims.

What is claimed is:

1. In an automatic steering system for directing a moving body equipped with steering gear toward a target, a transmitter adapted, upon energization, to project wave energy, a normally conductive vacuum tube including a cathode, an anode and a control grid, means adapted to control said steering gear upon cut-off of conduction of said vacuum tube, a receiver adapted, upon the reception of echoes of said wave energy reflected from said traget, to impress negative cut-off voltage on the control grid of said tube, a circuit energizing the transmitter at spaced transmission intervals separated by listening periods, said circuit being adapted to impress positive voltage on said control grid during said transmission intervals, said positive voltage being of a magnitude sufficient to overcome the effect of said cut-off voltage and thereby blank the receiver.

2. In an automatic steering system for directing a moving body equipped with steering gear toward a target, a transmitter adapted, upon energization, to project wave energy, a receiver adapted, upon the reception of echoes of said wave energy reflected from said target, to generate separate D.C. voltages of relative magnitudes varying with the direction of reception of said echoes, a comparator bridge adapted, upon differential energization by said voltages, to provide a control voltage of a predetermined polarity, means responsive to said control voltage for operating said steering gear, a circuit energizing the transmitter at spaced transmission intervals separated by listening periods, said circuit being adapted to impress voltage of a polarity opposite said predetermined polarity on said comparator bridge during said spaced intervals to neutralize said control voltage and thereby blank said receiver during transmitter operation.

3. In an automatic steering system for directing a moving body equipped with steering gear toward a target, a transmitter adapted, upon energization, to project wave energy, a receiver adapted, upon the reception of echoes of said wave energy reflected from said target, to generate separate D.C. voltages of relative magnitudes varying with the direction of reception of said echoes, a normally conductive vacuum tube including a cathode, an anode and a control grid, means adapted to control said steering gear upon cut-off of conduction of said vacuum tube, a comparator bridge adapted, upon differential energization by said voltages, to impress negative cut-off voltage on the control grid of said tube, a circuit energizing the transmitter at spaced transmission intervals separated by listening periods, said circuit being adapted to impress positive voltage on said comparator bridge during said transmission intervals, said positive voltage being of a magnitude sufficient to overcome the effect of said cut-off voltage and thereby blank the receiver.

References Cited by the Examiner

UNITED STATES PATENTS

| | | | |
|---|---|---|---|
| 1,916,016 | 6/33 | Rives. | |
| 1,970,423 | 8/34 | Frink. | |
| 2,409,632 | 10/46 | King | 114—23 |
| 2,483,187 | 9/49 | Dolberg | 114—23 X |
| 2,530,035 | 11/50 | Watt | 177—386.1 |
| 2,566,858 | 9/51 | Sebring | 177—386.1 |

CHESTER L. JUSTUS, *Primary Examiner.*

NORMAN H. EVANS, JAMES L. BREWRINK, *Examiners.*